(12) United States Patent
Theytaz

(10) Patent No.: US 9,851,568 B2
(45) Date of Patent: Dec. 26, 2017

(54) RETINAL DISPLAY PROJECTION DEVICE

(71) Applicant: Logitech Europe S.A., Lausanne (CH)

(72) Inventor: Olivier Theytaz, Savigny (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/495,282

(22) Filed: Sep. 24, 2014

(65) Prior Publication Data

US 2015/0085333 A1   Mar. 26, 2015

(30) Foreign Application Priority Data

Sep. 25, 2013 (CH) .............................. 2013CH-1640

(51) Int. Cl.
*G02B 27/01* (2006.01)
*G02B 26/08* (2006.01)
*G02C 11/00* (2006.01)

(52) U.S. Cl.
CPC ..... *G02B 27/0176* (2013.01); *G02B 26/0833* (2013.01); *G02B 27/017* (2013.01); *G02C 11/10* (2013.01); *G02B 2027/0178* (2013.01)

(58) Field of Classification Search
CPC .......................... G02B 26/0841; G02B 26/105; G02B 26/085; G02B 26/0858; G02B 26/0833; G02B 26/101; B81B 3/0083; B81B 3/0086; B81B 3/04
See application file for complete search history.

(56) References Cited

U.S. PATENT DOCUMENTS

| | | |
|---|---|---|
| 5,251,333 A | 10/1993 | Tsook |
| 5,481,622 A | 1/1996 | Gerhardt |
| 5,585,871 A | 12/1996 | Linden |
| 5,764,203 A | 6/1998 | Holmlund et al. |
| 6,431,705 B1 | 8/2002 | Linden |
| 7,677,723 B2 | 3/2010 | Howell et al. |
| 9,500,868 B2 | 11/2016 | Dopilka et al. |
| 2001/0011968 A1 | 8/2001 | Tidwell |
| 2001/0043208 A1 | 11/2001 | Furness et al. |
| 2001/0043402 A1 | 11/2001 | Melville et al. |
| 2002/0085175 A1 | 7/2002 | Butler et al. |
| 2002/0097498 A1 | 7/2002 | Melville et al. |
| 2002/0175880 A1 | 11/2002 | Melville et al. |
| 2004/0174599 A1 | 9/2004 | Dietrich |
| 2005/0119642 A1 | 1/2005 | Grecu |
| 2006/0139374 A1 | 6/2006 | Ritter et al. |

(Continued)

FOREIGN PATENT DOCUMENTS

| | | |
|---|---|---|
| EP | 0344881 B1 | 12/1989 |
| EP | 1394592 A1 | 3/2004 |

OTHER PUBLICATIONS

U.S. Appl. No. 14/753,984, filed Jun. 29, 2015, by Olivier Theytaz.

(Continued)

*Primary Examiner* — Jennifer L Doak
(74) *Attorney, Agent, or Firm* — Kilpatrick Townsend & Stockton LLP

(57) ABSTRACT

A retinal display projection device comprising a micro-projection component (2) arranged for projecting an image directly onto the retina of a user wearing the device, characterized in that said micro-projection component is arranged for projecting an image outside of the normal field of view of said user.

21 Claims, 4 Drawing Sheets

(56) References Cited

U.S. PATENT DOCUMENTS

| | | |
|---|---|---|
| 2007/0052672 A1 | 3/2007 | Ritter et al. |
| 2009/0086165 A1 | 4/2009 | Beymer |
| 2009/0122385 A1 | 5/2009 | Hilton |
| 2009/0190094 A1 | 7/2009 | Watanabe et al. |
| 2011/0102874 A1* | 5/2011 | Sugiyama ............ G02B 26/101 359/205.1 |
| 2012/0105310 A1 | 5/2012 | Sverdrup et al. |
| 2012/0157114 A1 | 6/2012 | Alameh |
| 2012/0293773 A1 | 11/2012 | Publicover |
| 2014/0043320 A1 | 2/2014 | Tosaya et al. |
| 2015/0199009 A1 | 7/2015 | Raffle |
| 2015/0378162 A1 | 12/2015 | Bailey |
| 2016/0026847 A1 | 1/2016 | Vugdelija |
| 2016/0073945 A1 | 3/2016 | Fine |
| 2016/0262608 A1 | 9/2016 | Krueger |
| 2016/0378180 A1 | 12/2016 | Theytaz |

OTHER PUBLICATIONS

Butow et al. "Quick Reference for the Google Glass Touchpad," book content sample http://www.diummies.com/how-to/content/quick-reference-for-the-google-glass-touchpad.html (Apr. 2014), 2 pages.

Tweney "Bet you didn't know you needed a remote control for Google Glass," http://venturebeat.com/2013/06/05/bet-you-didnt-know-you-needed-a-remote-control-for-google-glass/ (Aug. 5, 2013), 4 pages.

"Sensors on Google Glass," http://thecodeartist.blogspot.com/2013/65/sensors-on-google-glass.html (May 2013), 2 pages.

Saenz "Augmented Reality on Your Glasses, Maps in Your Eyes," http://singularityhub.com/2010/10/24/augmented-reality-on-your-glasses-maps-in-your-eyes-video/ (Oct. 24, 2010), 3 pages.

Non-Final Office Action dated Jan. 10, 2017, for U.S. Appl. No. 14/753,984, filed Jun. 29, 2017, 23 pages.

Final Office Action dated May 19, 2017, for U.S. Appl. No. 14/753,984, filed Jun. 29, 2017, 27 pages.

Non-Final Office Action dated Sep. 5, 2017, for U.S. Appl. No. 14/753,984, filed Jun. 29, 2015, 27 pages.

* cited by examiner

RETINAL DISPLAY PROJECTION DEVICE

CROSS-REFERENCES TO RELATED APPLICATIONS

This application claims the priority to Swiss Provisional Patent Application Number 2013CH-1640, entitled "A Retinal Display Projection Device" filed Sep. 25, 2013.

BACKGROUND OF THE INVENTION

The present invention concerns a retinal projection device comprising a movable light source controlled for projecting an image directly onto the retina of a user wearing the device.

Sport activities such as jogging, biking, diving etc. are often practised with a device that display sport related data, such as heart pulse, speed, pace, calories burnt, and so on. Classical data display for sportsman are often based on a wristwatch or on a display mounted on the handlebar of a bike for example. Therefore, the sportsman who wants to read data on the display is distracted from his sport activity, which might be impossible or dangerous depending on the activity.

As a more convenient alternative, it has already been suggested to display sport-related data with a head-mounted display or, more conveniently, with glasses. In one example, sport data are displayed during the sport activity with a retinal projection device.

Retinal projection devices are known as such. They usually comprise a light source and a mems-based mirror arranged for orienting the laser beam directly onto a selected portion of the retina of the user wearing the device. By scanning the laser beam and controlling its intensity, the device projects an image that is superimposed over the image of the scene viewed by the user.

Conventional retinal displays are usually conceived so as to replace a large portion of user's field of view by a projected image. In this case, the user does not see the scene behind the projected area, which is unacceptable for many sport applications where the sportsman needs an unobstructed field of view.

Retinal displays that display a large transparent image overlaid over the real scene are also known. In this case, the user is able to see simultaneously the scene of the real word with an image or some objects superimposed over this view. This is also very distracting for most sport activities where the sportsman needs to concentrate most of the time exclusively on the real scene, and only occasionally wants to see data related to his sport activity.

Displaying a large image with a retinal display requires fast moving mirrors and fast transmission rates for transmitting large image frames. This results in a high power consumption, and in voluminous batteries that frequently needs to be replaced or recharged.

Most retinal display systems moreover require dedicated glasses. Those glasses are usually not well suited for sport activities. Different sports require different type of glasses. For example, large glosses with optimal sun and fog protection are often used for skiing, while jogging is preferably made with lighter sun glasses. Users who need medical glasses have difficulties in using conventional retinal display systems.

BRIEF SUMMARY OF THE INVENTION

Embodiments of the present invention relate to a new wearable projection device that is better adapted to sport activities. A retinal projection device that is less distracting during exercise of a sport activity is provided.

In one embodiment, a retinal projection device that could be used with virtually any type of existing medical or sport glasses is provided.

According to one embodiment of the invention, a retinal display projection device is provided comprising a micro-projection component arranged for projecting an image directly onto the retina of a user wearing the device, in which the micro-projection component is arranged so as to project an image outside of the normal field of view of said user.

The micro-projection component may comprise:
at least one light source, for example a LED, or a laser such as a VCSEL component;
one first lens in the path of light emitted by said laser light source;
said mems-based mirror or mirrors;
one second lens for collimating the light beam deflected by said mirror or mirrors onto the retina of said user.

The remote control can be associated with a sport equipment. The sport equipment can be one of the following:
a ski or walking pole;
a bicycle handlebar;
a scuba or diving equipment;
a paddle or
any other suitable sport equipment.

BRIEF DESCRIPTION OF THE DRAWINGS

The invention will be better understood with the aid of the description of an embodiment given by way of example and illustrated by the figures, in which.

DETAILED DESCRIPTION OF THE INVENTION

Figure 1:
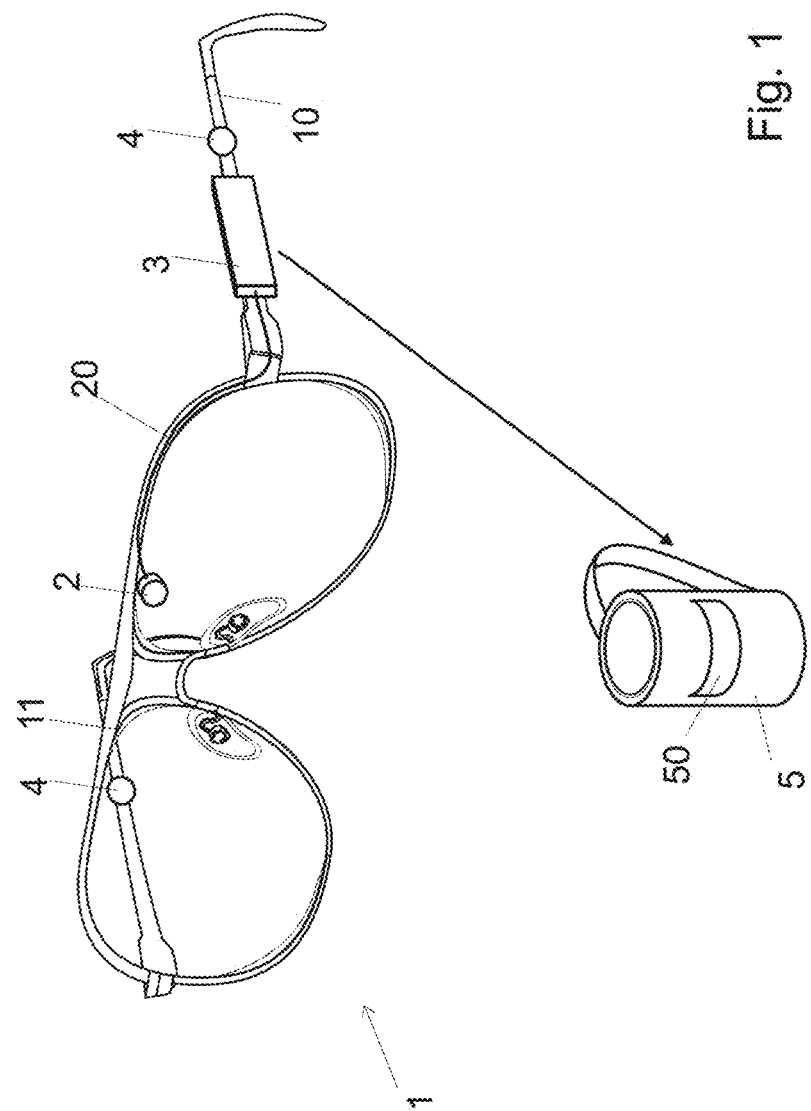
FIG. 1 shows a perspective view of a complete system according to one embodiment of the invention.

The retinal projection device in one embodiment is a non see-through device.

The normal field of view of the user is the field of view when the user sees in a sensibly horizontal direction with the head in a neutral, straight position. A direction is considered to be sensibly horizontal if it deviates by less than +−15° from the horizontal direction.

Alternatively, the retinal display device is replaced by a micro-display, such as a LCD, OLED or LED display, mounted onto glasses outside of the normal field of view of said user.

Since the image is projected outside of the normal field of view of the user, the user has to change his gazing direction in order to view the projected image.

Alternatively, the user has to move the micro-projection component in order to view the image. The micro-projection component can be mounted on a movable arm.

This has the advantage that the image displayed by the retinal display device is not permanently visible; the user has to move his sight in order to see it. Thus, the retinal display image is less distracting and less obstructive.

In one embodiment, the device is arranged for projecting a light beam which is only visible when the user orientates his gaze in an unusual direction, for example upward or downward. Thus, the displayed image is substantially invisible when the user watches in a more horizontal direction.

In one embodiment, the device is arranged for projecting an image which is focused when the user focuses his eye at a predetermined distance, for example at a predetermined distance between 0.5 and 5 meters, preferably between 2 and 3 meters. Thus, the image is less visible or distracting when the user focuses at a different distance, for example when he focuses at infinity which is common in many sport activities.

In one embodiment, the micro-projection component is arranged for projecting an image of a size equivalent to a rectangle with side lengths comprised between 20 and 50 cm at a distance comprised between 1.5 and 5 meters. Thus, the size of the displayed image is limited, which is less distracting and frees a larger part of the users' field of view. This size is nevertheless sufficient for displaying sport relevant data, such as for example heart rate, speed, pace, etc.

In one embodiment, the movable light source can comprise one mems-based mirror movable in two independent directions for scanning the display area.

The micro-projection component can comprise two mirrors independently movable in different directions for scanning the display area.

In one embodiment, a new wearable projection device with reduced power consumption is provided. The use of VCSELs components as laser source allows for a very low consumption, very small volume, and low cost. Various manufacturers produce VCSELs components emitting in visible light.

Instead, a pinhole LED can also be used.

The use of more than one laser source allows for projection of colour images by mixing sources with different colours, such as red, green and blue.

In one embodiment, a single laser source is used for displaying a monochrome image, allowing a higher contrast and a lower consumption and volume.

The second lens can be arranged for focusing said light beam onto said retina when the eye is focused at a distance comprised between 0.5 and 4 meters.

In one embodiment, the device has no movable mirror, but instead one movable laser source. This reduces the number of components.

The device can comprise mounting means for removably mounting it on existing glasses. Thus, it could be adapted to various glasses for different sports and different users' tastes or size heads.

The device can also be non removable and for example integrated in the glasses.

The mounting means can comprise a hook-and-loop fastener. Hook-and-loop fasteners are supplied by the company Velcro among others. This allows easy adapting to glasses of various shape or size.

The mounting means can comprise an elastically deformable clip element.

The mounting means can be arranged for removably mounting at least one component of the device onto one branch of said glasses.

The mounting means can be arranged for removably or permanently mounting at least one component of the device onto a glass of said glasses.

The mounting means can comprise a permanent or re-adherable adhesive.

The mounting means can be arranged arranged for removably mounting the device onto the frame of said glasses.

The light beam emitted by the micro-projection component of the device can go through the glass of the glasses.

Different components of the device can be permanently or removably mounted onto different parts of existing glasses.

One component can be mounted onto one branch of the glasses. Another component can be mounted on the external surface of one glass.

The different components can be mutually connected by a wire connection.

The device can comprise one remote control for controlling the type of information that is displayed. For example, the remote control can be used for selecting among different indications to display, for example between heart rate/speed/power/pace/and so on.

A plurality of indications can be displayed at the same time. The remote control can be used to select among various sets of indications, each set comprising one or more indications.

The remote control can be connected to the device over a wireless connection.

The remote control can be an integral part of the sport equipment, or removably mounted onto an existing sport equipment.

In one embodiment, the remote control is actionable with the thumb.

In one embodiment, the remote control is worn as a ring, for example on the forefinger.

The remote control can comprise a roller actionable with the thumb or with a finger.

The remote control can comprise one button actionable with the thumb or with a finger.

The remote control can comprise one roller actionable with the finger for selecting an indication, and one button actionable with one finger to confirm the selection.

The roller can be combined with a push button in order to confirm a selection by pushing the roller.

The remote control can comprise one button to wake up the device from a sleep mode.

The activation of the button on the remote control can trigger the projection device.

In one embodiment the projection device is in sleep mode until activated by the button (or activated by eye gaze, or head inclination).

The roller can allow a user to pre-select a given pre-programmed type of information. This last is being displayed (i.e. beamed) for a defined duration (typically 5 seconds) only when the user press the button.

If the micro-projector is placed on a motorized arm, the button activation may position the projection device in the user direct field of view (i.e. horizontal).

The device can comprise at least one micro-projector arranged for being mounted in the field of view of said user, and one radio-frequency receiver arranged for being mounted outside the field of view of said user when said glasses are worn, said micro-projector and said receiver being mutually connected over a wire connection.

The retinal display projection device illustrated in FIGS. 1 to 4 comprises a micro-projection component 2, a control component 3 and an optional remote control 5. The micro-projection component 2 and the control component 3 are mounted onto existing glasses 1, or could be integral with dedicated glasses or goggles. The micro-projection component 2 can be connected with the control component 3 over a wire connection 20. Alternatively, those two components 2, 3 can be integrated into one single part. Alternately, a wireless connection can be used.

The device 2,3,5 can comprise or be connected with other devices including sensors 4 and/or processing means for generating other indications. For example, the device can be wirelessly connected with a wristwatch, mobile phone, satellite based navigation system, heart rate sensor, accelerometer, pedometer, computer, running sensor, etc., that produce additional indications that can be displayed with the retinal display projection device.

The remote control 5 can be mounted onto different sport equipment, for example on a ski or walking pole, on a bicycle handlebar, or on a scuba or diving equipment. It could also be integral with one such dedicated sport equipment. Alternatively, it could be worn on a finger, for example as a ring on the forefinger. The remote control comprises haptic means 50, such as at least one roller and/or at least or one button or a tactile surface, that can be manipulated with the user's thumb or fingers for entering command, such as indication selection commands and indication confirmation commands, that are wirelessly transmitted to a receiver 31 as part of the control component 3. The wireless connection can be based for example on a Bluetooth, Ant, Zigbee or proprietary protocol. The remote control can comprise a battery. Alternatively, the remote control is powered by an energy harvesting system, for example using a microgenerator for producing power from movements of the remote control.

The micro-projection component 2 can be permanently, removably or re-adhesively mounted onto existing glasses or goggles. In the illustrated embodiment, the micro-projection component 2 is directly mounted, for example using a permanent or re-adherable adhesive, onto the external surface of one glass of the glasses 1. Alternatively, the micro-projection component 2 can be mounted onto the external surface of one glass, or on a branch/arm 10 of the glasses, or on the frame 11, using fixing means such as hook-and-loop fasteners, or clip means. The user can preferably adapt the position of the micro-projection component 2 according to his viewing preferences.

In another embodiment (not illustrated), the micro-projection component 2 is motorized and/and or mounted onto an arm or articulation for displacing it relative to the glasses 1, and bringing it into the user's field of main view (sensibly horizontal), or removing it from the user's field of view. The micro-projection component 2 can in this case comprise or be mounted onto the distal end of a rotatable arm. The other end of the arm is fixed relative to the glasses and can be mounted for example on the branch 10 or frame 11 of the glasses.

Figure 2:
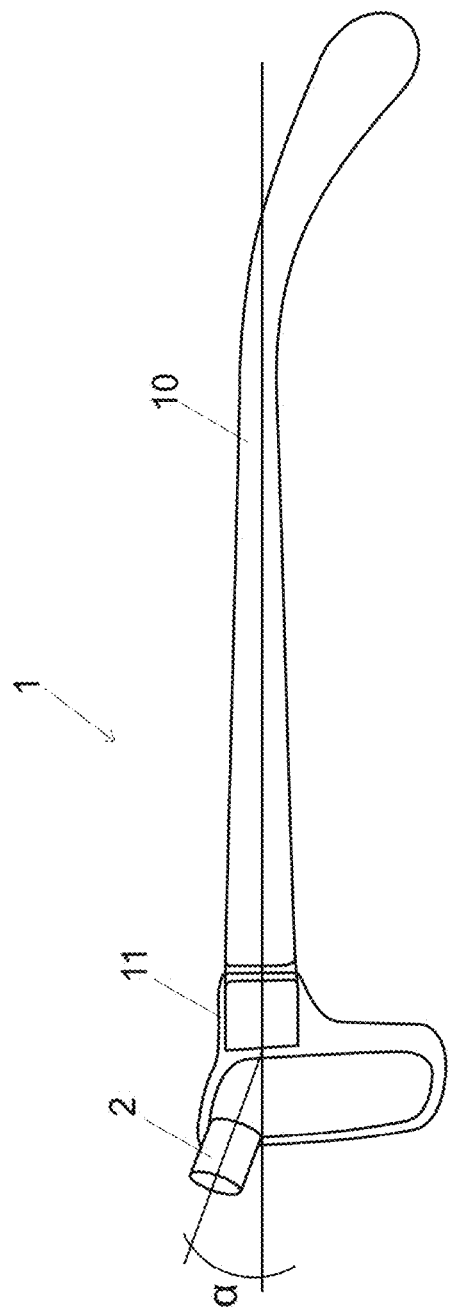
FIG. 2 shows a side view of a retinal display projection device according to one embodiment of the invention.

As can be seen in particular on FIG. 2, the micro-projection component 2 is preferably mounted onto, directly against or at short distance of the external surface of a glass of the glasses.

The micro-projection device 2 is preferably mounted above or possible below the line of sight of the user when the user watches in a horizontal direction with the head in a neutral, straight position. The micro-projection device 2 is preferably mounted so that the middle direction of the beam light that it emits is not horizontal when the glasses 1 are horizontal, so as to create an angle α between the middle sending direction and the horizontal gazing direction. In this way, the image projected by the micro-projection component is most of the time unnoticeable by the user, unless when he moves his gazing direction upwards (or possibly downwards) toward the component 2. The angle α is advantageously comprised between 15° and 25°. This angle corresponds to the comfortable eye upward looking direction without creating strains w/r to 0° which is the horizontal sight view (for head in normal vertical position) and also corresponds to the micro-projection device 2 angle, or the micro-projection exiting beam direction thanks to a wedge or equivalent.

The angle α can preferably be adjusted by the user and/or automatically.

Figure 3:
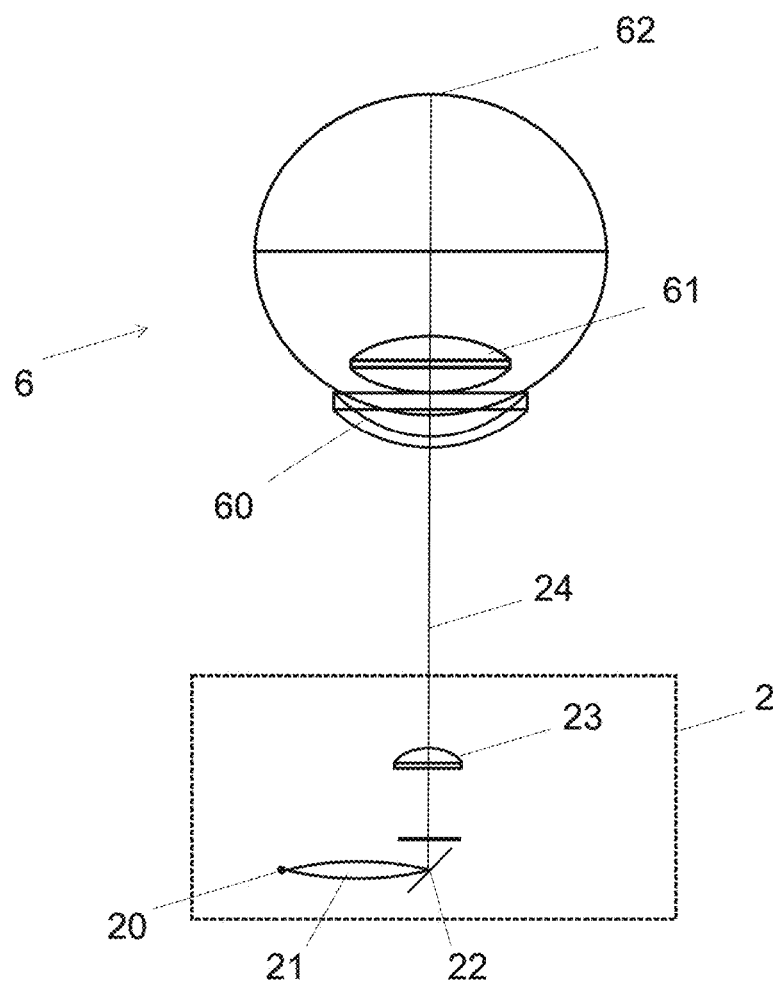
FIG. 3 shows a block diagram of a retinal display projection device according to one embodiment of the invention.

FIG. 3 illustrates various elements of one embodiment of the micro-projection component 2 and of the user's eye 6. The micro-projection component 2 comprises one light source 20 for generating a monochromatic image, or three laser sources with different wavelengths for generating a colour image by mixing the three light beams. The light source can be a VCSEL laser that emits visible light, a LED, such as a pinhole LED, or any other suitable light source.

A focusing lens 21 in front of the laser source 20 focuses the light and projects it onto a mirror 22 that can oscillate around two orthogonal axes. Alternatively, two mirrors each alternating around one single axis could be used. In yet another embodiment, the micro-projection component 2 comprises one movable laser source 20 that replaces one or both mirrors. The mirrors and/or the laser source are oscillated so as to scan a preferably rectangular image.

The brightness of each pixel is controlled by varying the intensity of light emitted by each laser source at each instant of time.

The light source can be placed on the same substrate as the MEMS with the mirrors, or in a different substrate. Deflecting elements might be provided between the light source and the movable mirrors. Other embodiments could be considered.

The light deflected by the mirror(s) is collimated by a collimating lens 23 and directed onto the retina 62 of the user's eye 6, by passing through the cornea 60 and eye lens 61. The distance to the lens 23 can preferably be adjusted to accommodate for user's vision and/or glass thickness.

The micro-projection system 2 can comprise at least one additional light source for emitting at least one light beam that can indicate additional information, such as for example training zones. The additional light beam(s) preferably reaches the user's eye without being reflected by the mirror 22. The additional light source can comprise a light ring around the lens 23. The additional light source can comprise one or a plurality of LEDs, for example multicolour LEDs.

In another embodiment the additional light source could be diffused on the mirror and superimposed on the micro-projected main light.

The color of the additional light source might be different than the color of the main light source.

The micro-projection system 2 can comprise a vibration reduction system, for example vibration reduction system based on an electrodynamic or piezoelectric system, for compensating vibrations. The anti-vibration system can be controlled by an inertial sensor.

Figure 4:
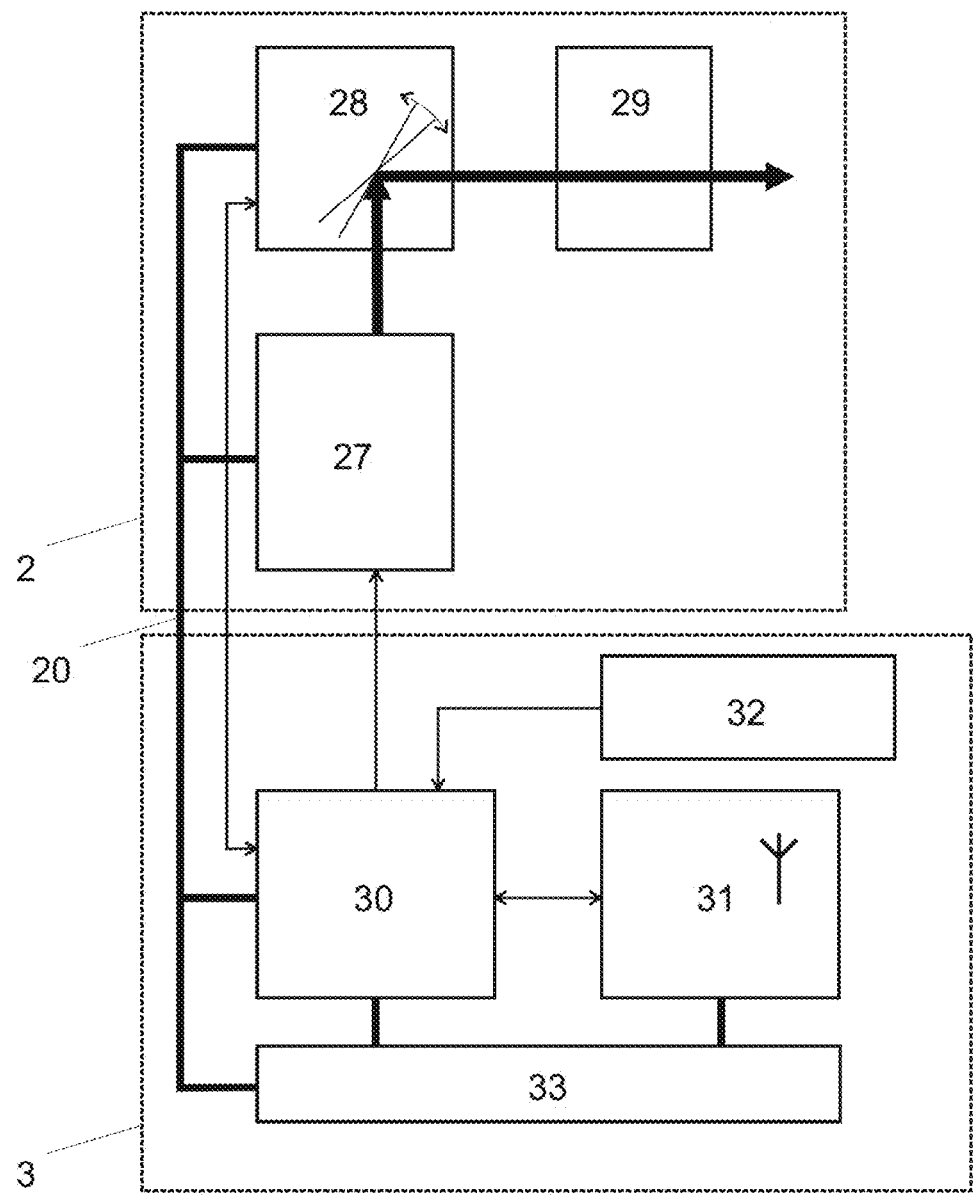
FIG. 4 shows a schematic view of the projecting component of a device according to one embodiment of the invention.

FIG. 4 illustrates a possible bloc-schema of the device 2, 3. The micro-projection component 2 comprises at least one laser source 27 with its driving circuit, one or two movable scanning mirrors and some optical components 29, such as lenses 21, 23. The mirrors 28 and possible the laser source and/or the driving elements can be integrated as one MEMS component. Those elements are preferably packaged into one waterproof housing with a window for the emitted light. The power supply is preferably provided by the control component 20 over the cable 20. The micro-projection component 2 can comprise mounting means for mounting it on, directly against or through, or in front of the external glass of glasses, so that the middle direction of the light beam projected by the component will go through the glass.

In one embodiment the projection component 2 could be integrated into the glasses frame. The glass might have some clear aperture or cut to accommodate the size of the projection component 2.

The control component 3 comprises in this example a power supply element 33 with a battery, such as a lithium-polymer battery, and power management circuit. The battery can also be external to the component 3, for example within the frame or branch or the glasses.

The control component 3 can comprise a connector, such as for example a micro USB or proprietary connector, for rechargeability and firmware update and data upload/download (e.g. various displays linked to roller selection). This can also be done wirelessly.

The element 30 is a microcontroller for controlling the laser and driver 27 and the other components. The element 31 is a radio-frequency transceiver, such as a Bluetooth, ANT, Zigbee or proprietary module, for communicating with a remote control and/or with external sensors as mentioned.

The control component 3 can also comprise sensors, such as an ambient light sensor 32 for measuring the current illumination level and adapt the brightness of the displayed image accordingly and/or in function of user preferences or selections. Preferably, the ambient light sensor is part of the micro-projection component 2.

The control component 3 can comprise or be connected with an inertial sensor, for example an accelerometer and/or gyroscope with one or a plurality of axes. The inertial sensor can be used for detecting movements or vibration of the glasses and for controlling an anti-vibration system (not shown) for reducing the adverse effects of vibrations of the micro-projection component on the quality and comfort of the projection.

The control component 3 can comprise a piezoelectric element for generating an audible vibration as a signal, for example when the user exceeds a predetermined speed or heart rate. This piezoelectric element may be a buzzer. The audible sound can be either an air wave sound or a bone conducted vibration that creates as well sound in the ear. The piezoelectric element may then warns the user and may temporarily replace the need of the remote control 5 to trigger information or provide directions.

The control component 3 can comprise or be connected with electrodes for measuring the heart rate.

The device 2, 3 can also comprise a gaze sensor for detecting the users' gazing direction. The gazing direction can be used for entering command, for example for selecting indications to display by gazing at a corresponding icon or selection area.

The device 2, 3 can also comprise a head inclination sensor for detecting the head inclination. Head movements can be used for selecting or confirming commands.

Various alternative embodiments could be considered by a skilled person within the frame of the invention which is only restricted by the attached claims.

What is claimed is:

1. A retinal display apparatus comprising:
   a head-mounted user equipment;
   a projection device (2, 3) mounted on the head-mounted user equipment with all of the projection device being outside a normal, forward field of view of a user, such that no part of the device is in the normal, forward field of view of the user, the projection device comprising a micro-projection component (2) mounted on the head-mounted user equipment, the micro-projection component being a non see-through device and being outside a normal, forward field of view of the user;
   wherein the micro-projection component is arranged for projecting an image directly onto the retina (62) of the user, characterized in that said micro-projection component (2) is arranged for projecting an image directly onto the retina from a position outside of the normal field of view of said user, such that the user has to change gazing direction from a horizontal, forward gaze by at least 15 degrees in order to have the image reach the user's retina so the user can view the projected image.

2. The apparatus of claim 1, wherein said micro-projection component (2) is mounted outside the normal field of view of said user and is arranged for projecting an image directly on a retina, so that the image is first formed on the retina, and the image is of a size equivalent to a rectangle with side lengths comprised between 20 and 50 cm at a distance comprised between 1.5 and 5 meters, and wherein no component of the device is within 15 degrees of the center of the field of view of the user when the user has a horizontal, forward gaze.

3. The apparatus of claim 1, wherein said micro-projection component (2) comprises one mems-based mirror movable in two independent directions, or two mirrors each movable in one direction.

4. The apparatus of claim 1, said micro-projection component (2) comprising:
   one VCSEL light source (20);
   one first lens (21) in the path of light emitted by said VCSEL light source;
   at least one mems-based mirror (22);
   a second lens (23) for collimating the light beam deflected by said mirror onto the retina (62) of said user.

5. The apparatus of claim 1 wherein the projection device is mounted so that the middle direction of the beam light that it emits is at an angle of between 15 to 25 degrees.

6. The apparatus of claim 5 wherein one of said angle and a position of the device is adjustable by the user.

7. The apparatus of claim 4, wherein said second lens (23) is arranged for focusing said light beam onto said retina when the eye is focused at a distance comprised between 0.5 and 4 meters.

8. The apparatus of claim 1, wherein the head-mounted user equipment comprises glasses, and further comprising mounting means for removably mounting the projection device on the glasses.

9. The apparatus of claim 8, wherein said mounting means comprise a hook-and-loop fastener.

10. The apparatus of claim 8, wherein said mounting means comprise elastically deformable clip element.

11. The apparatus of claim 8, wherein said mounting means are arranged for removably mounting at least one component (3) of said projection device onto one branch of said glasses.

12. The apparatus of claim 8, wherein said mounting means are arranged for removably mounting at least one component (2) of said projection device onto a glass of said glasses (1).

13. The apparatus of claim 8, wherein said mounting means are arranged for removably mounting said micro-projection component (2) onto the frame (11) of said glasses.

14. The apparatus of claim 1, further comprising a remote control (5) for at least one of selecting the indication that is displayed and for triggering the display on demand.

15. The apparatus of claim 6 further comprising a processing subsystem for assisting the user with adjusting one of the angle and the position of the projection device.

16. The apparatus of claim 14, wherein said remote control is attached to one of the following:
- a pole;
- a bicycle handlebar;
- a component of diving equipment; and
- a paddle.

17. The apparatus of claim 14, wherein said remote control (5) further comprises an input element actionable with a thumb.

18. The apparatus of claim 1, further comprising one control component (3) arranged for being mounted outside the field of view of said user when said head-mounted user equipment is worn, said micro-projection component (2) and said control component (3) being connected over a wire connection (20).

19. The apparatus of claim 18, wherein the control component comprises a piezoelectric element for generating an audible vibration.

20. A retinal display projection device (2, 3) comprising:
- a micro-projection component (2) arranged for mounting on glasses for projecting an image directly onto the retina (62) of a user wearing the device, the micro-projection component being a non see-through device with all of the projection component being outside a normal, forward field of view of a user, such that no part of the device is in the normal, forward field of view of the user, the projection device comprising;
- said micro-projection component (2) being positioned for projecting an image directly onto the retina from a position outside of the normal field of view of said user, such that the user has to change gazing direction from a horizontal, forward gaze by at least 15 degrees in order to have the image reach the user's retina so the user can view the projected image;
- wherein one of an angle and a position of the micro-projection component is adjustable by the user;
- a control component (3) arranged for being mounted outside the field of view of said user when said glasses are worn, said micro-projection component (2) and said control component (3) being communicatively coupled; and
- a remote control (5) communicatively coupled to the control component.

21. A projection device for mounting on a head-mounted user equipment comprising:
- a non see-through micro-projection component;
- mounting means for mounting the micro-projection component on the head-mounted user equipment outside a normal, forward field of view of a user, such that no part of the device is in the normal, forward field of view of the user;
- wherein the micro-projection component is arranged for projecting an image directly onto the retina of the user;
- wherein the micro-projection component is arranged for projecting an image directly onto the retina from a position outside of the normal field of view of said user, such that the user has to change gazing direction from a horizontal, forward gaze by at least 15 degrees in order to have the image reach the user's retina so the user can view the projected image.

* * * * *